US006585433B2

(12) United States Patent
Davies et al.

(10) Patent No.: US 6,585,433 B2
(45) Date of Patent: Jul. 1, 2003

(54) PRINT SIGNAL GENERATION

(75) Inventors: Brad L. Davies, Trumbull, CT (US); Mark A. Scribe, Southbury, CT (US); Andrew Zink, Stafford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/803,640

(22) Filed: Mar. 9, 2001

(65) Prior Publication Data

US 2002/0127040 A1 Sep. 12, 2002

(51) Int. Cl.[7] ................................................. B41J 3/36
(52) U.S. Cl. ............................ 400/70; 400/61; 400/76; 400/103; 400/104
(58) Field of Search ............................... 400/70, 61, 76, 400/104, 103

(56) References Cited

U.S. PATENT DOCUMENTS

| | | | |
|---|---|---|---|
| 5,707,158 A | 1/1998 | Hansel et al. ............... | 400/61 |
| 5,871,288 A | 2/1999 | Ryan, Jr. et al. ........... | 400/103 |
| 6,370,521 B1 * | 4/2002 | Pigos et al. ................. | 707/2 |
| 6,470,327 B1 * | 10/2002 | Carroll et al. .............. | 705/401 |

OTHER PUBLICATIONS

Information–Based Indicia Program (IBIP) Performance Criteria for Information–Based Indicia and Security Architecture for Closed IBI Postage Metering Systems (PCIBI–C), Jan. 12, 1999, The United ates Postal Service (USPS).

Information–Based Indicia Program (IBIP), Performance Criteria for Information–Based Indicia and Security Architecture for Open IBI Postage Evidencing Systems (PCIBI–O), Feb. 23, 2000, The United States Postal Service (USPS).

* cited by examiner

Primary Examiner—Charles H. Nolan, Jr.
(74) Attorney, Agent, or Firm—George M. Macdonald; Angelo N. Chaclas; Charles R. Malandra

(57) ABSTRACT

A print signal generation system for generating print bit map data corresponding to a desired image where the print bit map data is utilized by a digital printing device to print the desired image. The system includes region parameter data, a first data generation system and a second data generation system in operative communication with the first data generation system. The region parameter data includes region data defining a partitioning of the desired image into a plurality of regions and expansion data. The first data generation system generates transaction data associated with the desired image and using the transaction data in combination with the region parameter data to generate print instruction data. The second data generation system receives the print instruction data from the first data generation system and expands the print instruction data based upon the region parameter data to generate the print bit map data.

22 Claims, 6 Drawing Sheets

T1 → REGION DEFINITION AND EXPANSION TABLE ← RPD
| REGION # | START COL. | END COL. | START ROW | END ROW | X FACTOR | Y FACTOR |
|---|---|---|---|---|---|---|
| 1 | 1 | 980 | 1 | 510 | 2 | 2 |
| 2 | 1 | 1650 | 511 | 600 | 1650 | 90 |
| 3 | 1 | 1650 | 601 | 900 | 4 | 4 |
| 4 | 981 | 1540 | 1 | 300 | 20 | 300 |
| 5 | 981 | 1540 | 301 | 510 | 2 | 2 |
| 6 | 1541 | 1950 | 1 | 510 | 2 | 2 |
| 7 | 1651 | 1950 | 511 | 900 | 300 | 390 |
FIG. 8
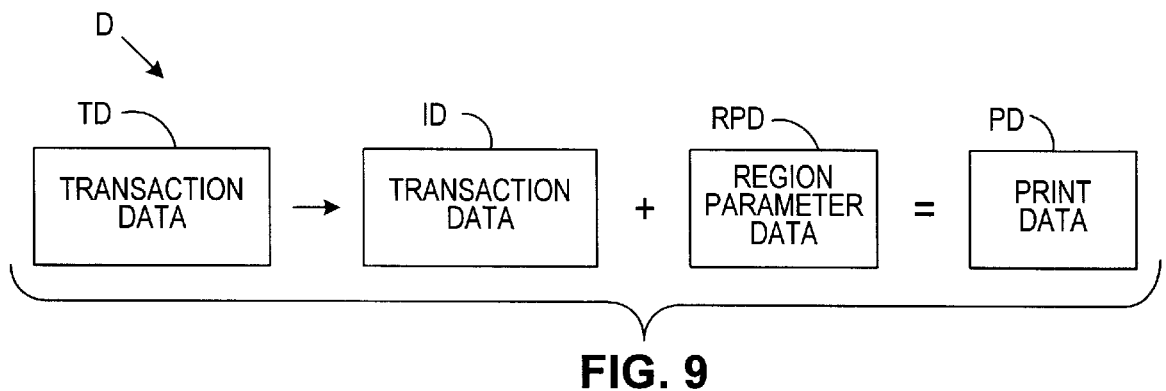
FIG. 9
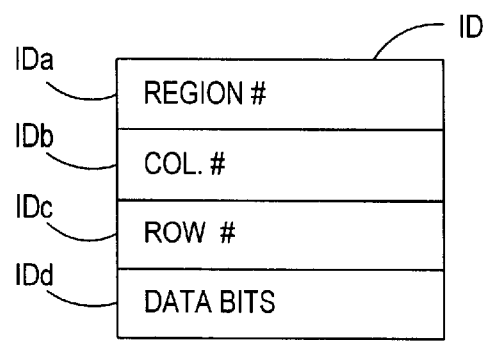
FIG. 10

PRINT SIGNAL GENERATION

FIELD OF THE INVENTION

This invention relates to printing technology. More particularly, this invention is directed to a system and method for generating print data signals for a digital printer.

BACKGROUND OF THE INVENTION

Generally, digital printers and bar codes are well known in the art. Bar codes are printed patterns of intermixed black bars and white spaces where the sequence of bars and spaces correspond to previously defined characters. The bar codes are read bar code scanner (reader) to derive the characters that they represent. Traditional one-dimensional bar codes may use the bar's width to encode a product or account number. Two-dimensional bar codes, such as PDF417, MaxiCode and DataMatrix, are scanned horizontally and vertically and hold considerably more data. The use of bar codes in various industries has proliferated over the years with the result that bar codes are found almost everywhere. Bar codes provide operational advantages to many industries by automating the retrieval of information. Typically, information contained in bar codes may be retrieved more quickly and with fewer errors than with other techniques, such as human reading of printed words.

Because of these operational advantages, bar codes have been adapted for a diverse range of uses. For example, the retail store industry uses bar codes printed on tags, labels and tickets attached to merchandise for inventory tracking, pricing information and producing detailed customer receipts. Similarly, the grocery store industry uses bar codes printed directly on a product or a product's packaging for the same purposes. These are examples of point-of-sale applications for bar codes. However, many other uses exist for bar codes which are outside of point-of-sale applications. An example is found in many manufacturing industries where bar codes are used internally for production control. Another example is in the health care industry where bar codes are used for patient identification and specimen tracking. Still another example is the United States Department of Defense (DOD) which requires all vendors to designate the contents of every package delivered to any United States military agency in a bar code label affixed to the package.

Another application where bar codes are beginning to be used is the postage metering industry. In some countries, such as the United States, the postal authorities have developed requirements (discussed in greater detail below) for postal indicia that require the use of bar codes. Generally, postage metering systems are well known in the art. Typically, the traditional mechanical and electronic postage meters have employed physical security and specialized inks to prevent fraud. The registers that maintain an accounting of postal funds have been located within a secure housing along with a dedicated printer. As a further measure, the dedicated printers have used fluorescent ink to provide an extra aid in the detection of an authentic postage meter indicium.

More recently, postal authorities have promulgated regulations that allow postage meter manufacturers to utilized digital printing technology (laser, ink jet, thermal transfer, etc.), either embedded as part of a mail handling system or as a general purpose office printer. As an example, the United States Postal Service (USPS) has enabled the decoupling of the postage meter and the printer and allowed the use of digital printers by establishing an Information-Based Indicia Program (IBIP). The IBIP is a distributed trusted system established by the USPS to retrofit and augment existing postage meters using new technology known as information-based indicia. The IBIP relies on digital signature techniques to produce for each mail piece an indicium whose origin cannot be repudiated. Thus, in contrast to traditional postage metering systems employing mechanical printing technology and physical security, the IBIP supports new .methods of securely applying postage to mail pieces. Generally, the IBIP requires printing a high-density two-dimensional (2D) bar code on a mail piece. The 2D bar code encodes various information associated with the mail piece and is subsequently signed with a digital signature.

The USPS has published detailed specifications for the IBIP. Generally, the IBIP is directed to two types of postage metering systems. The first type is referred to as a closed system and is defined in the INFORMATION BASED INDICIA PROGRAM—PERFORMANCE CRITERIA FOR INFORMATION-BASED INDICIA AND SECURITY ARCHITECTURE FOR CLOSED IBI POSTAGE METERINGS SYSTEMS, dated Jan. 12, 1999, ("IBIP Closed System Specification"). Closed systems require a special purpose (dedicated) printer. The second type is referred to as an open system and is defined in the INFORMATION BASED INDICIA PROGRAM—PERFORMANCE CRITERIA FOR INFORMATION-BASED INDICIA AND SECURITY ARCHITECTURE FOR OPEN IBI POSTAGE EVIDENCING SYSTEMS, dated Feb. 23, 2000, ("IBIP Open System Specification"). Open systems allow the user to print postage with an ordinary off the shelf commercial printer. Together, the IBIP Closed System Specification and the IBIP Open System Specification define the requirements for next generation postage metering systems. Thus, postage metering systems need to generate print data signals necessary to produce a postal indicium that, for IBIP compliant systems, includes a bar code. Accordingly, whether the postage metering system is of the closed or open type, interfacing with a plurality of digital printers to produce the bar code is essential.

A typical postal indicium is between 1.0 and 1.5 inches high and 2.75 and 3.5 inches wide. Thus, for a commonly available 600×600 density (dots per inch) printer a bit map including millions of bits must be generated in order to print the postal indicium. This bit map takes time to produce and transfer to the printer.

Therefore, there is a need for an effective and efficient print signal generation system and method. Furthermore, there is a need for a efficient print signal generation system and method that reduces the data processing requirements of the overall system while maintaining and/or improving upon its integrity.

SUMMARY OF THE INVENTION

Accordingly, it is an object of the present invention to provide a mail piece verification system that addresses some of the issues discussed above.

A print signal generation system generates print bit map data corresponding to a desired image where the print bit map data is utilized by a digital printing device to print the desired image. The system includes region parameter data, a first data generation system and a second data generation system in operative communication with the first data generation system. The region parameter data includes region data defining a partitioning of the desired image into a plurality of regions and expansion data. The first data generation system generates transaction data associated with the desired image and using the transaction data in combination with the region parameter data to generate print instruction data. The second data generation system receives the print instruction data from the first data generation system and expands the print instruction data based upon the region parameter data to generate the print bit map data.

Additionally, there are provided a method of generating print bit map data, a postage metering system and a method of generating postal indicium bit map data.

Various objects and advantages of the invention will be set forth in the description that follows, and in part will be obvious from the description, or may be learned by practice of the invention. Moreover, the objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIG. 8 is a table showing region parameter data corresponding to the regions shown in FIG. 7 in accordance with the present invention.

FIG. 9 is a schematic flow diagram of a data stream associated with printing the postal indicium in accordance with the present invention.

FIG. 10 is schematic diagram of a file format for instruction data generated by the postage metering system in accordance with the present invention.

DETAILED DESCRIPTION OF THE PREFERRED EMBODIMENTS

Figure 1:
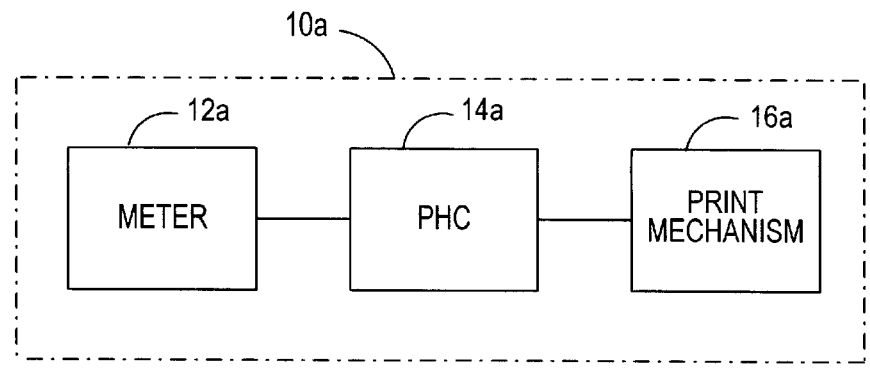
FIG. 1 is a simplified schematic representation of an example of a closed system type of postage metering system in which the present invention may be incorporated.

Referring to FIG. 1, a simplified schematic representation of an example of a closed system type of postage metering system 10a is shown. Generally, the postage metering system 10a includes a postage meter 12a, a print head controller 14a and a print mechanism 16a. Typically, the a postage meter 12a, a print head controller 14a and a print mechanism 16a are all located or detachably mounted to a mailing machine base (not shown). Since the postage metering system 10a may be of any conventional architecture, such as the Galaxy® mailing machine and the DM300™ digital mail processor, both available from Pitney Bowes Inc. of Stamford, Conn., a detailed discussion of the postage metering system 10a is not necessary for an understanding of the present invention.

Figure 2:
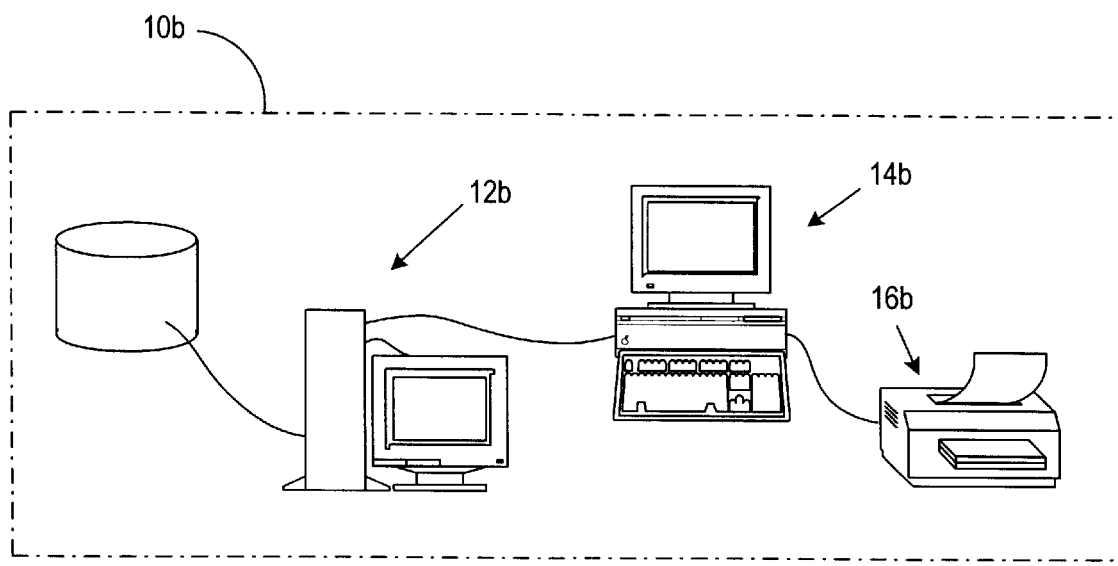
FIG. 2 is a simplified schematic representation of an example of an open system type of postage metering system in which the present invention may be incorporated.

Referring to FIG. 2, a simplified schematic representation of an example of an open system type of postage metering system 10b is shown. Generally, the postage metering system 10b includes a postage meter server and database system 12b, a remotely located personal computer 14b and a general purpose office printer 16b. Since the postage metering system 10b may be of any conventional architecture, such as the ClickStamp® Online internet postage system available from Pitney Bowes Inc. of Stamford, Conn., a detailed discussion of the postage metering system 10b is not necessary for an understanding of the present invention.

Referring to FIGS. 1 and 2, although the present invention may be implemented in either a closed system type of postage metering system 10a or an open system type of postage metering system 10b, the remainder of the description will focus on an implementation for closed system type of postage metering system 10a.

Figure 3:
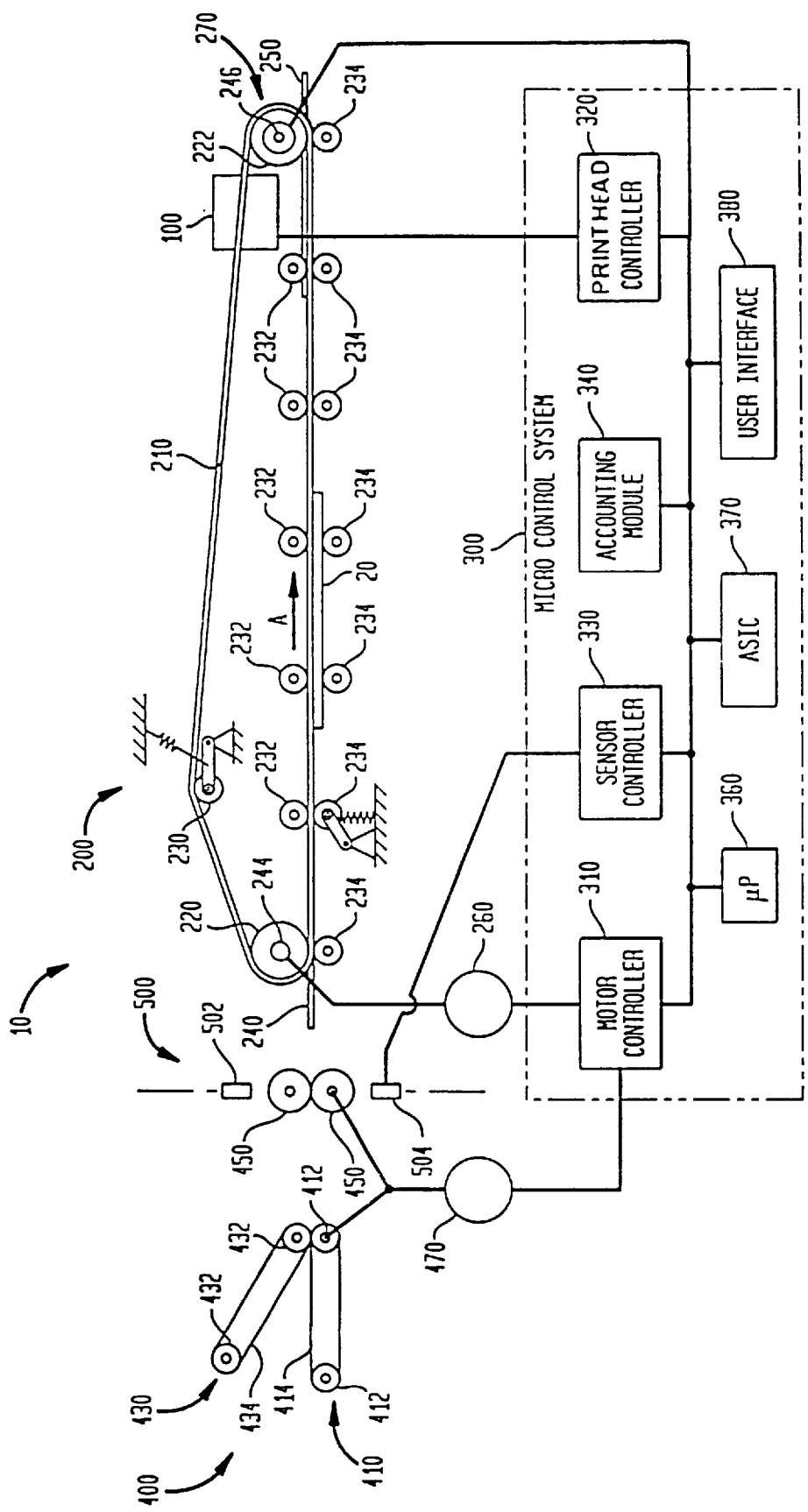
FIG. 3 is a more detailed schematic representation of the closed system type of postage metering system of FIG. 1.

Referring to FIG. 3, a more detailed schematic of an elevational view of a particular implementation of a closed system type of postage metering system 10 is shown. The postage metering system 10 includes a printer module 100, a conveyor apparatus 200, a micro control system 300 and a singulator module 400. However, those skilled in the art will recognize that the exact configuration of the postage metering system 10 is dependent upon the needs of the customer.

The singulator module 400 receives a stack of mail pieces (envelopes, postcards, folders, labels and the like) and separates and feeds them in a seriatim fashion (one at a time) in a path of travel as indicated by arrow A. The conveyor apparatus 200 feeds the envelopes 20 in the path of travel along the deck 240 past the printer module 100 so that a postal indicium (not shown) can be printed on each mail piece 20. Together, the singulator module 400 and the conveyor module 200 make up a transport apparatus for feeding the mail pieces 20 through the various modules of the postage metering system 10.

The singulator module 400 includes a feeder assembly 410 and a retard assembly 430 which work cooperatively to separate a batch of envelopes (not shown) and feed them one at a time to a pair of take-away rollers 450. The feeder assembly 410 includes a pair of pulleys 412 having an endless belt 414 extending therebetween. The feeder assembly 410 is operatively connected to a motor 470 by any suitable drive train which causes the endless belt 414 to rotate clockwise so as to feed the envelopes in the direction indicated by arrow A. The retard assembly 430 includes a pair of pulleys 432 having an endless belt 434 extending therebetween. The retard assembly 430 is operatively connected to any suitable drive means (not shown) which causes the endless belt 434 to rotate clockwise so as to prevent the upper mail pieces in the batch of mail pieces from reaching the take-away rollers 450. In this manner, only the bottom mail pieces in the stack of mail pieces advances to the take-away rollers 450. Those skilled in the art will recognize that the retard assembly 430 may be operatively coupled to the same motor as the feeder assembly 410.

The take-away rollers 450 are located adjacent to and downstream in the path of travel from the singulator module 400. The take-away rollers 450 are operatively connected to motor 470 by any suitable drive train (not shown). Generally, it is preferable to design the feeder assembly drive train and the take-away roller drive train so that the take-away rollers 450 operate at a higher speed than the feeder assembly 410. Additionally, it is also preferable that the take-away rollers 450 have a very positive nip so that they dominate control over the mail piece 20. Consistent with this approach, the nip between the feeder assembly 410 and the retard assembly 430 is suitably designed to allow some degree of slippage.

The postage metering system 10 further includes a sensor module 500 that is substantially in alignment with the nip of take-away rollers 450 for detecting the presence of the envelope 20. Preferably, the sensor module 500 is of any conventional optical type that includes a light emitter 502 and a light detector 504. Generally, the light emitter 502 and the light detector 504 are located in opposed relationship on opposite sides of the path of travel so that the mail piece 20 passes therebetween. By measuring the amount of light that the light detector 504 receives, the presence or absence of the mail piece 20 can be determined. Generally, by detecting the lead and trail edges of the mail piece 20, the sensor module 500 provides signals to the micro control system 300 which are used to determine the length of the mail piece 20 and measure the gap between successive envelopes 20.

The conveyor apparatus 200 includes an endless belt 210 looped around a drive pulley 220 and an encoder pulley 222 which is located downstream in the path of travel from the drive pulley 220 and proximate to the printer module 100. The drive pulley 220 and the encoder pulley 222 are substantially identical and are fixably mounted to respective shafts (not shown) which are in turn rotatively mounted to any suitable structure (not shown) such as a frame. The drive pulley 220 is operatively connected to a motor 260 by any conventional means such as intermeshing gears (not shown) or a timing belt (not shown) so that when the motor 260 rotates in response to signals from the micro control system 300, the drive pulley 220 also rotates which in turn causes the endless belt 210 to rotate and advance the envelope 20 along the path of travel.

The conveyor apparatus 200 further includes a plurality of idler pulleys 232, a plurality of normal force rollers 234 and a tensioner pulley 230. The tensioner pulley 230 is initially spring biased and then locked in place by any conventional manner such as a set screw and bracket (not shown). This allows for constant and uniform tension on the endless belt 210. In this manner, the endless belt 210 will not slip on the drive pulley 220 when the motor 260 is energized and caused to rotate. The idler pulleys 232 are rotatively mounted to any suitable structure (not shown) along the path of travel between the drive pulley 220 and the encoder pulley 222. The normal force rollers 234 are located in opposed relationship and biased toward the idler pulleys 232, the drive pulley 220 and the encoder pulley 222, respectively.

As described above, the normal force rollers 234 work to bias the mail piece 20 up against the deck 240. This is commonly referred to as top surface registration which is beneficial for ink jet printing. Any variation in thickness of the mail piece 20 is taken up by the deflection of the normal force rollers 234. Thus, a constant space (the distance between the printer module 100 and the deck 240) is set between the mail piece 20 and the printer module 100 no matter what the thickness of the mail piece 20. The constant space is optimally set to a desired value to achieve quality printing. It is important to note that the deck 240 contains suitable openings (not shown) for the conveyor apparatus 200.

The sensor module 500, the singulator module 400, conveyor apparatus 200 and the printer module 100 are under the control of the micro control system 300 which may be of any suitable combination of microprocessors, firmware and software. The micro control system 300 includes a motor controller 310 which is in operative communication with the motors 260 and 470, a printer controller 320 which is in operative communication with the printer module 100, a sensor controller 330 which is in operative communication with the sensor module 500; an accounting module 340 for authorizing and accounting for the dispensing of postal funds; a microprocessor 360; a security application specific integrated circuit (ASIC) 370 and the user interface 380. The motor controller 310, the printer controller 320, the sensor controller 330, the accounting module 340 and other various components of the micro control system 300 are all in operative communication with each other over suitable communication lines. Generally, the microprocessor 360 coordinates the operation and communications between the various sub-systems of the postage metering system 10. Typically, the various modules 100 and 340 and controllers 310, 320 and 330 have their own microprocessors, other discrete logic devices and application software. However, the exact arrangement of the micro control system 300 is largely a matter of design choice and constitute a part of the present invention.

The accounting module 340 serves a secure vault for dispensing/accounting for the amount of postage used and generating print data necessary (described in greater detail below) to print a valid postal indicium 30. The accounting module 340 works in combination with the security application specific integrated circuit (ASIC) 370 to generate the postal indicium 30. Typically, the accounting module 340 stores accounting information concerning its usage in a variety of registers. An ascending register tracks the total amount of postage dispensed by the meter over its lifetime. That is, the ascending register is incremented by the amount of postage dispensed after each transaction. A descending register tracks the amount of postage available for use. Thus, the descending register is decremented by the amount of postage dispensed after each transaction. When the descending register has been decremented to some value insufficient for dispensing postage, then the postage metering system 10 inhibits further printing of postal indicia 30 until the descending register is resupplied with funds.

Figure 4:
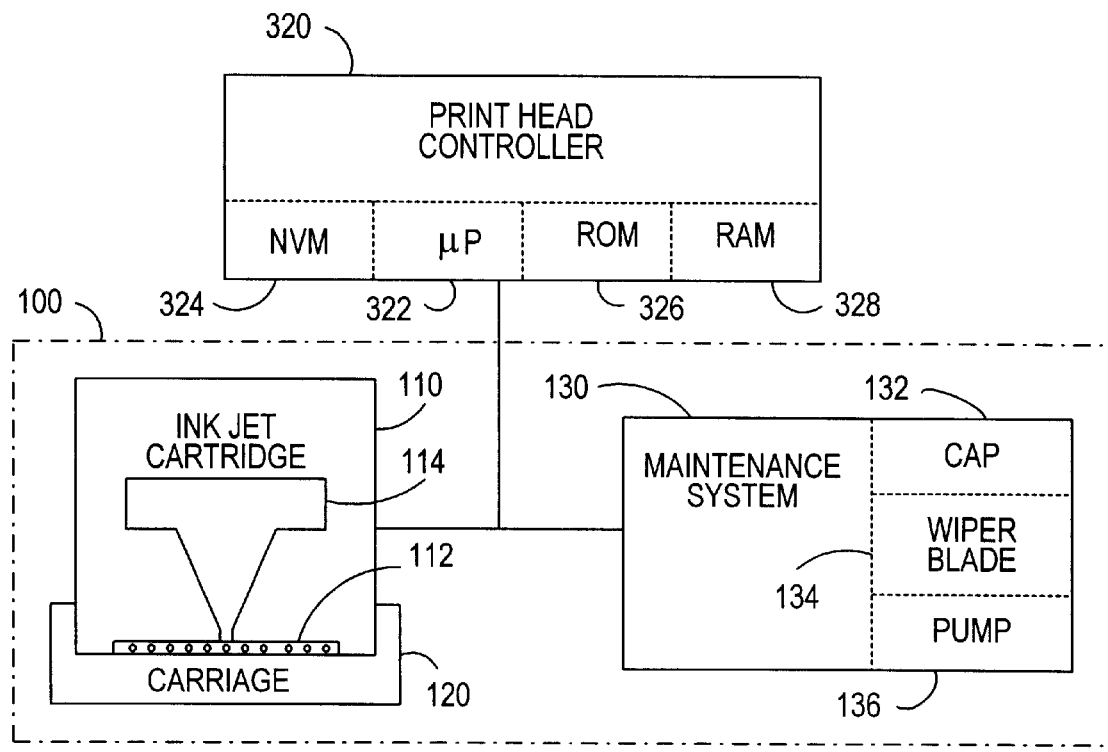
FIG. 4 is an example of a postal indicium printed by the closed system type of postage metering system of FIG. 1 in accordance with the present invention.

Referring to FIG. 4, a more detailed schematic representation of the printer module 100 and the print head controller 320 is shown. The printer module 100 includes a carriage 120, an ink jet cartridge 110 detachably mounted to the carriage 120 in any conventional fashion and a maintenance system 130. The ink jet cartridge 110 includes an array of ejection nozzles 112 (either bubble jet type or piezoelectric element type) and ink 114 operatively connected to the array of ejection nozzles for supplying ink 114 to the array of ejection nozzles 112. To effect printing, the array of ejection nozzles 112 is arranged substantially transverse to the path of travel. Generally, the maintenance system 130 performs a variety of maintenance operations on the ink jet cartridge 110 to keep the ink jet cartridge 110 in proper working condition. Any conventional system (not shown) for repositioning the carriage 120 and the maintenance system 130 into and out of operative engagement (maintenance position) may be employed and repositioning the carriage 120 to a print position proximate to the path of travel so as to print the postal indicium (not shown). The maintenance system 130 includes a cap 132, a wiper blade 134 and a pump 136. The printer module 100 further includes suitable framework (not shown) for supporting the various components of the printer module 100.

To keep the ink jet cartridge 110 in proper working order, a variety of maintenance actions, such as capping, wiping, normal flushing, power flushing, normal purging and power purging, have been developed. Most of these maintenance actions are directed toward preventing the array of nozzles (not shown) from becoming clogged with stale ink or other debris. When not in use, the ink jet cartridge 110 is sealed off from ambient air by the cap 132. In this manner, the evaporation rate of any solvents or other volatiles contained within the ink (not shown) is reduced and the ink is less prone to clumping. The wiper blade 134 is typically employed to squeegee any excess ink or other debris off from the face plate (not shown) of the array of nozzles (not shown). This cleaning action is typically performed both prior to capping and prior to printing. A normal flush involves firing each nozzle in the array of nozzles a predetermined number or times to expel ink that may be beginning to clump. A power flush is similar to a normal flush except that the number of time each nozzle is fired is substantially greater than that for a normal flush. A normal purge involves using the pump 136 to apply a vacuum for a predetermined amount of time to the array of nozzles to suck out ink. A power purge is similar to a normal purge except that the amount of time that the vacuum is applied is substantially greater than that for the normal purge.

The print head controller 320 includes a microprocessor 322, a non-volatile memory (NVM) 324, a read only memory (ROM) 326 for storing application software necessary to operate the print head controller 320 and a read access memory (RAM) 328. The ROM 326 stores various operating software programs executed by the microprocessor 322 when placed into RAM 328. The NVM 324 stores various other data, described in more detail below, that is accessed by the operating software programs.

Figure 5:
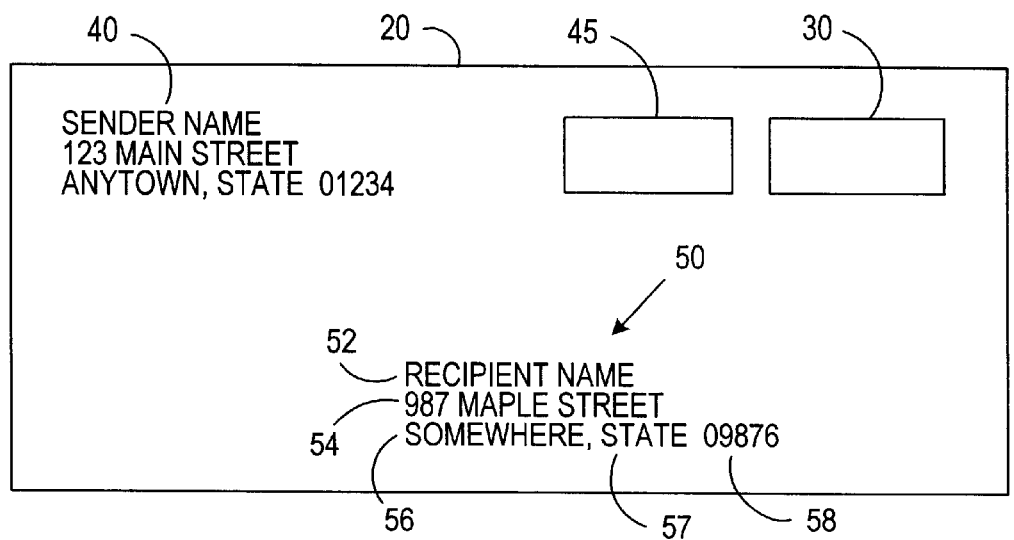
FIG. 5 is an example of a mail piece printed by the closed system type of postage metering system of FIG. 1 in accordance with the present invention.

Referring to FIG. 5, a more detail representation of a typical mail piece 20 is shown. The mail piece 20 includes the postal indicium 30 (described in greater detail below), a sender address 40 (optional) and a recipient address 50. The recipient address 50 provides information to the postal authority corresponding to a delivery location. The typical recipient address 50 includes a recipient name 52 (personal, business or generic (occupant)), recipient delivery information 54 (street address, post office box number, etc.), a city name 56, a state name 57 and a ZIP code 58.

Figure 6:
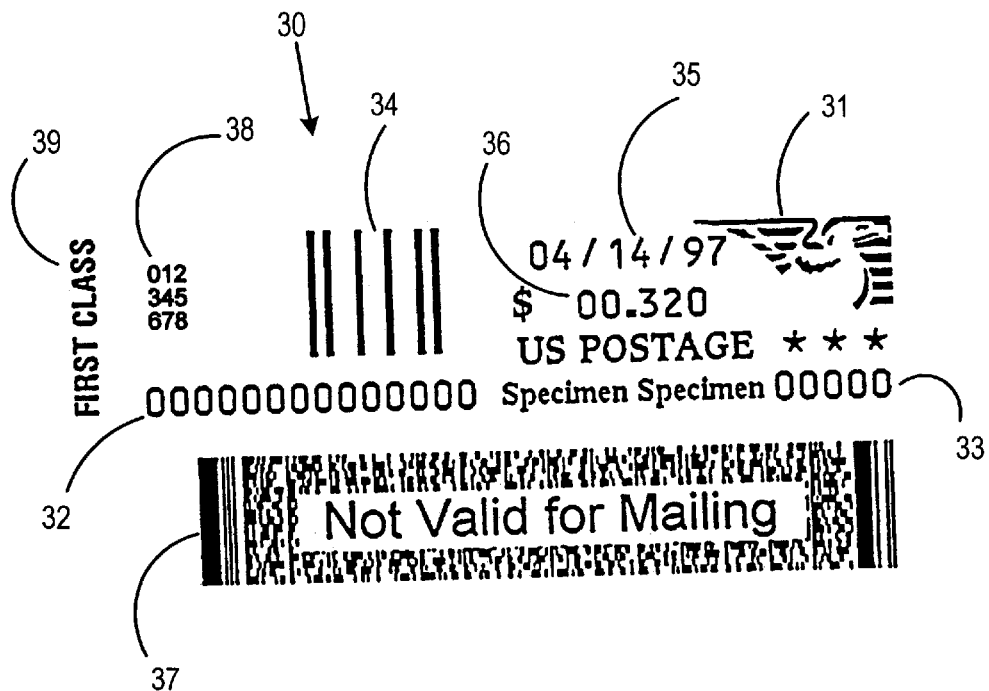
FIG. 6 is an enlarged view of the postal indicium printed by the closed system type of postage metering system of FIG. 1 in accordance with the present invention.

Referring to FIG. 6 in view of FIG. 5, a more detailed view of the postal indicium 30 is shown. Since the postal indicium 30 does not constitute a part of the present invention, the following description is being provided with respect to a particular type of postal indicium 30 by way of background. Generally, the postal indicium 30 is of fixed format. That is, the high fixed data content in combination with the fixed variable data fields yield postal indicia 30 that are very predictable or highly standardized. Thus, the postal indicium 30 is very consistent between successive mail pieces 20 in that it typically fits within the same predefined boundaries and contains the same arrangement of data fields, even if the data within each field varies from indicium 30 to indicium 30. The postal indicium 30 includes both fixed data that does not change from indicium to indicium and variable data that may change. The fixed and variable data may change depending upon postal authority requirements and the needs of the postage system manufacturer, but generally can be summarized as follows. The fixed data includes a graphic design 31 (an eagle with stars and US POSTAGE), a meter serial number 32 uniquely identifying the postage meter. (not shown) that produced the postal indicium 30, a licensing post office ID (Zip Code) 33 and an optional facer identification mark (FIM) 34 used during post office processing. The variable data (transaction type information) includes a date 35 indicating when the postage was dispensed, a postal value 36 indicating an amount of postage, an indication of a service class 39 (first class, bulk rate, priority, overnight, certified, etc.) that has been selected for the mail piece 20, a bar code 37 containing both elements of both fixed and variable data and, in the most preferred embodiment, authentication information 38. The bar code 37 may be of any conventional format and is provided for the purpose of improving machine readability and increasing automated processing of the mail piece 20. Preferably, the bar code 37 is a two dimensional (2D) bar code, such as PDF417. Generally, the authentication information 38 is an encrypted message, such as a digital signature, digital token or other data, derived from the information contained with the postal indicium 30. The authentication information 38 may be in any format, such as: alphanumeric string, bar code or the like. Most preferably, the authentication information 38 is incorporated into the bar code 37. Using the authentication information 38 and other data contained within the postal indicium 30, the postal authority can verify the authenticity of the postal indicium 30 using conventional techniques. Thus, the postal indicium 30 may also be classified as containing authentication information 38 and non-authentication information 31–37 and 39.

Referring to FIGS. 3–6, the accounting module 340 generates transaction data corresponding to various elements 31–39 of the postal indicium 30 that are necessary to print an authentic postal indicium. This transaction data is unique to each mail piece 20. From the transaction data, the accounting module 340 generates instruction data (not shown) that is transmitted to the print head controller 320 over suitable communication lines, such as: a bus, data link, or the like, for subsequent processing. The print head controller 320 uses the instruction data to generate print bit map data (not shown) that is transmitted to the printer module 100 to drive the printer module 100 as to how to produce the postal indicium 30.

As in all digital printers, the print data corresponds to a dot matrix pattern or bit map (rows and columns) indicating whether or not a particular dot is on (printed) or off (not printed). The density of the dot matrix pattern is controlled by two factors. First, in the direction transverse to the path of travel the print density, typically measured in dots per inch (dpi), is controlled by the size and spacing of the individual ejection nozzles that together form the array of ejection nozzles 112 and the size of the ink drops that they produce. Second, in the direction along the path of travel, the print density is controlled by the firing frequency of the array of ejection nozzles 112 and the speed of relative movement between the mail piece 20 and the ink cartridge 110.

Typically, printers come in standard print density configurations, such as: 300×300 dpi, 600×600 dpi and 1200×1200 dpi. However, since the print density is largely a matter of design choice and application needs, a wide variety of, and even non-symmetric, print densities are possible.

The postal indicium 30 is roughly 1.5 inches in a direction transverse to the path of travel and 3.25 inches in the path of travel. In a preferred embodiment, the print density of the printer module 100 is 600×600 dpi. As such, the postal indicium 30 is comprised of nineteen hundred fifty (1950) columns and nine hundred (900) rows. As is known in the art, the printer module 100 prints the postal indicium 30 by successively printing column after column as the print cartridge 110 and the mail piece 20 move relative to each other. Therefore, each column requires nine hundred (900) bits (1 bit for each dot) of printer driver data while the entire postal indicium 30 requires a bit map of one million seven hundred fifty-five thousand (1,755,000) bits of printer driver data (typically 0s are off and 1s are on).

Generally, the postal indicium 30 is very consistent between successive mail pieces 20 and includes internal portions (regions) that have known print characteristics and different print resolution requirements. Thus, not all regions of the postal indicium 30 need to be printed at high resolution to produce a quality image. For example, the bar code portions of the postal indicium 30 include rectangular shapes that are orthogonally aligned with the print head array (nozzles 112). Therefore, the bar code portions of the postal indicium 30 may be printed at lower resolution and still yield a quality image. As another example, several portions of the postal indicium 30 include spaces where no printing occurs.

Figure 7:
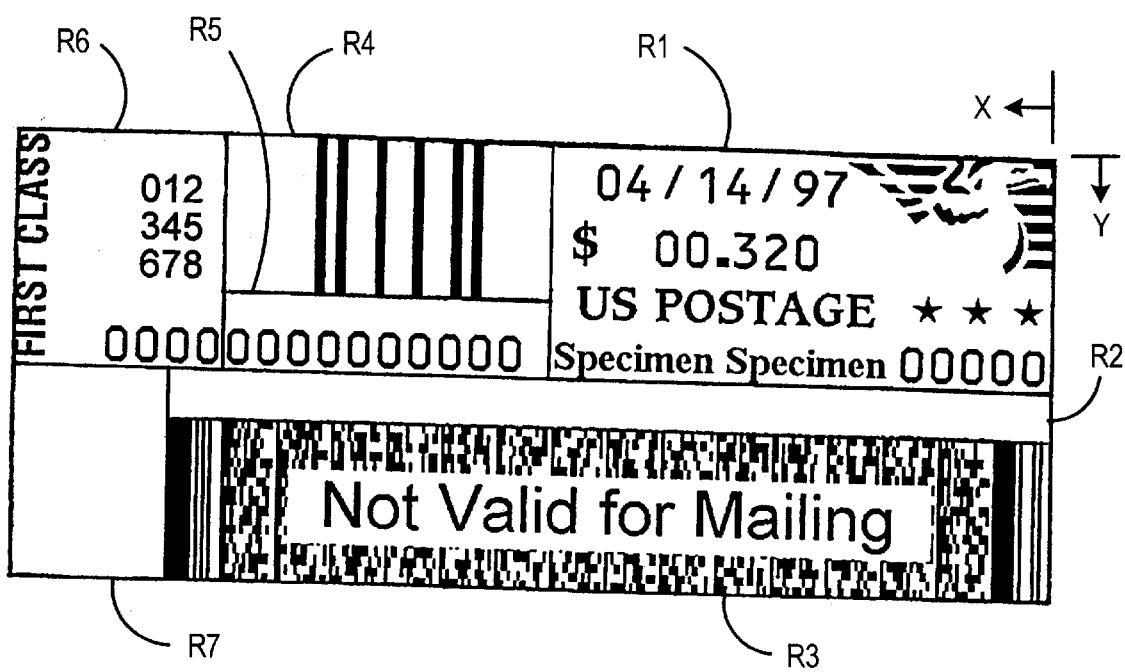
FIG. 7 is a further enlarged view of the postal indicium of FIG. 6 showing a partitioning of the postal indicium into regions in accordance with the present invention.

These factors may be taken advantage of to reduce the amount of data that the accounting module 340 has to generate to produce a complete bit map. Referring to FIG. 7, in view of FIGS. 3–6, a further enlarged view of the postal indicium 30 indicating how the postal indicium 30 has been partitioned into a plurality of print regions is shown. As discussed above, the postal indicium 30 includes comprised of nineteen hundred fifty (1950) columns and nine hundred (900) rows. Column number one (1) is located at the right most edge of the postal indicium 30 while row number one (1) is located at the top most edge of the postal indicium 30. This partitioning assists in making the generation and transfer of data between the accounting module 340 and the print head controller 320 more efficient. The plurality of print regions includes: a first region R1 encompassing the postal revenue block (graphics, postage amount, date, zip code, etc.); a second region R2 encompassing a no print space that serves as a buffer between the postal revenue block and the bar code 37; a third region R3 encompassing the bar code 37; a forth region R4 encompassing the FIM 34; a fifth region R5 encompassing a portion of the serial number 32; a sixth region R6 encompassing a remainder of the serial number 32, the authentication information 38 and the class indicator 39; and a seventh region R7 encompassing a no print space trailing the bar code 37.

The consistent nature and known print characteristics of the postal indicium 30 may be used to reduce the print data generation requirements of the accounting module 340 by reducing the instruction data that the accounting module 340 needs to produce and expanding instruction data at the print head controller 320 to generate the complete bit map of the print bit map data necessary to drive the cartridge 110. Referring to FIG. 8, in view of FIGS. 3–7, a table T1 showing the region parameter data RPD corresponding to the plurality of regions R1–R7 is shown. Preferably, the table T1 is stored in NVM 324 of the print head controller 320. The region parameter data RPD defines the physical attributes (size, location, etc.) of and expansion factors for each region. Most preferably, the physical attributes include a start and end column and a start and end row. In this way, a rectangular shape is defined. However, more elaborate mathematics may be employed to define regions of other shapes. Also, most preferably, each region includes an X-expansion factor that is used to expand the instruction data in a direction parallel to the path of travel (right to left in FIG. 7) and a Y-expansion factor that is used to expand the instruction data in a direction transverse to the path of travel (top to bottom FIG. 7).

Referring to FIGS. 9 and 10, in view of FIGS. 3–8, a schematic flow diagram D of the data stream associated with printing a postal indicium 30 and a file format for the instruction data ID are shown, respectively. The instruction data ID includes a region number IDa corresponding to one of the plurality of regions R1–R7, a start column number IDb, a start row number Idc and a string of print data bits IDd. As discussed above, the accounting module 340 generates transaction data TD in response to customer input (mail class, etc.), mail piece 20 parameters (weight, etc.) and/or previously defined parameters (date, serial number, etc.). Using the transaction data TD, the accounting module 340 generates the instruction data ID and transmits it to the print head controller 320 where the print head controller uses the region parameter data RPD to expand the print data bits IDd into the print bit map data bits PD. A couple of examples of this process are describe below for further clarification.

Figure 11:
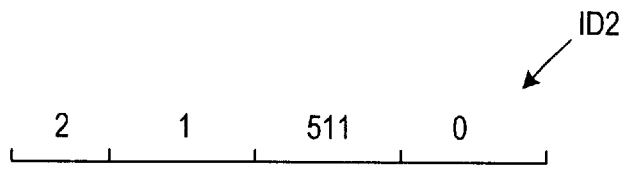
FIG. 11 an example of an instruction data block corresponding to one of the regions in accordance with the present invention.

Referring to FIG. 11, in view of FIGS. 3–10, an instruction data block ID2 corresponding to region R2 is shown. The instruction data block ID2 indicates that it is associated with region R2, has column one (1) as its start column, has row five hundred eleven (511) as its start row and includes a zero (0) as its sole data bit. Using the instruction data block ID2, the print head controller 320 expands the sole data bit into the one hundred forty-eight thousand five hundred (148,500) bits necessary to define the printer control signals for region R2. To accomplish this, the print head controller 320 recognizes that instruction data block ID2 is from region R2 and accesses the region parameter data RPD corresponding to region R2. The print head controller 320 then applies the X-expansion factor for R2 (1650) to the data bit and the Y-expansion factor for R2 (90) to the data bit to generate the printer control signals map for region R2. In this case, all the bits for region R2 are zeros since no printing occurs in this region.

Figure 12:
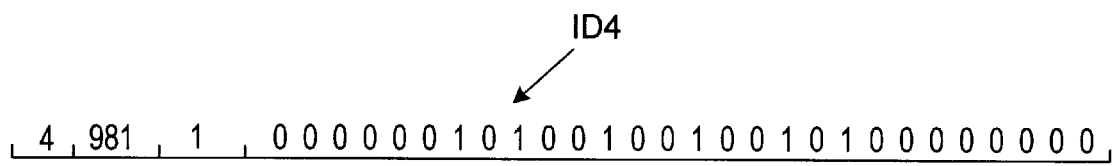
FIG. 12 another example of an instruction data block corresponding to another one of the regions in accordance with the present invention.

Referring to FIG. 12, in view of FIGS. 3–10, an instruction data block ID4 corresponding to region R4 is shown. Generally, region R4 encompasses the FIM 34 which is comprised of a series of black bars and white spaces wherein the bars are of uniform width (0.033 inches) and height (0.500 inches) separated by blank spaces that are whole number multiples of the bar width. The instruction data block ID4 indicates that it is associated with region R4, has column one (981) as its start column, has row five hundred eleven (1) as its start row and includes a string of twenty-eight (28) data bits (0s and 1s). Using the instruction data block ID4, the print head controller 320 expands the string of data bits into the one hundred sixty-eight thousand (168,000) bits necessary to define the printer control signals for region R4. To accomplish this, the print head controller 320 recognizes that instruction data block ID4 is from region R4 and accesses the region parameter data RPD corresponding to region R4. The print head controller 320 then applies the X-expansion factor for R4 (20) to each data bit in the string of data bits and the Y-expansion factor for R4 (300) to each data bit in the string of data bits to generate the printer control signals for region R4. Those skilled in the art will recognize that the X-expansion factor for R4 (20) has been established to work in combination with the 600×600 dpi print resolution so that the width of a bar of the FIM 34 equals one data bit (1/600 multiplied by 20 equals 0.033 inches). Similarly, the Y-expansion factor for R4 (300) has been established to work in combination with the 600×600 dpi print resolution so that the expansion in the direction transverse to the path of travel equals the height of the bars comprising the FIM 34 (1/600 multiplied by 300 equals 0.500 inches).

Referring particularly to FIGS. 7 and 8, in view of FIGS. 3–6, those skilled in the art will now appreciate that the region parameter data RPD may be adjusted to accommodate the printing requirements of each region R1–R7. In the discussion above for regions R2 and R4, the expansion factors were set to high values due to the nature of images (bars and spaces) being printed. On the other hand, the expansion factors for regions R1, R3, R5 and R6 are much smaller. The X and Y expansion factors for regions R1, R5 and R6 have been set to two (2) so that the practical result is a 300×300 printed image produced by 600 dpi size dots. The X and Y expansion factors for region R3 have been set to four (4) so that each data bit produced by the accounting module 340 for region R3 corresponds to the size of the smallest bar element in the 2D bar code 37 after expansion.

Referring to FIGS. 1–9, those skilled in the art will recognize that the instruction data ID for each of the regions R1–R7 will be expanded analogous in manner to that which has been described above with respect to regions R2 and R4 using the region parameter data RPD corresponding to each of the regions R1–R7. The print head controller 320 may use any conventional technique for organizing and assembling the print bit map data PD and subsequently streaming it to the cartridge 110. For example, the print head controller 320 may employ a buffer in printer memory RAM 328 for storing the print bit map data PD and a print register (not shown) also located in RAM 328 for assembly the print bit map data PD into correct locations prior to streaming the print data PD to the cartridge 110.

Those skilled in the art will now recognize that the present invention results in an effective print signal generation system 10. More particularly, for print images that are largely rectangular in shape, such as bar codes, the system 10 yields the benefits of higher resolution printers without the overhead of increased print data generation. On the other hand, for non-uniform print images, such as images containing graphs, the system 10 provides the ability to control printed resolution via the region parameter data RPD and expansion while keeping print data generation down.

Referring to FIGS. 1–12, those skilled in the art will now recognize that the present invention achieves other operational advantages. First, in the closed type metering systems 10a, the overall time for generating and printing the print bit map data PD is reduced. This is because the transfer of the instruction data ID between the accounting module 340 and the print head controller 320 typically is secured. Thus, the mutual authentication techniques and encryption/decryption processes that are commonly employed accounting module 340 and the print head controller 320 are only applied to the instruction data ID. Once the instruction data ID has been deemed valid, it may be expanded in an unsecure environment to produce the print data PD. As a result, the secure processes operate on a reduced amount of data over traditional systems.

Second, in open type metering systems 10b, the overall time for generating and printing the print bit map data PD is reduced. Generally, the central server 12b operates as a transaction data TD and instruction data ID generation system while the personal computer 14b operates as the print bit map data PD generation system. In a typical home office/small office (SOHO) environment, the connection between the personal computer 14b and the central server 12b is by modem (not shown) over conventional telephone lines. In contrast, the connection between the personal computer 14b and the printer 16b is typically hard wired with some industry standard data grade cable. Therefore, the transmission of data between the personal computer 14b and the central server 12b is at significantly slower rates (bits per second) than the processing speed of the personal computer 12b and the data transfer speed between the personal computer 14b and the printer 16b. Therefore, the arrangement of the present invention reduces overall cycle times for printing postal indicium 30.

Figure 13A:
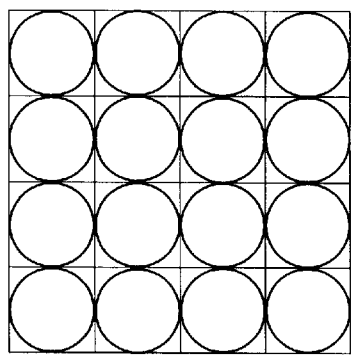
FIG. 13A is an enlarged view of a single bar element of a bar code printed by a 600 dpi resolution printer in accordance with the present invention.
Figure 13B:
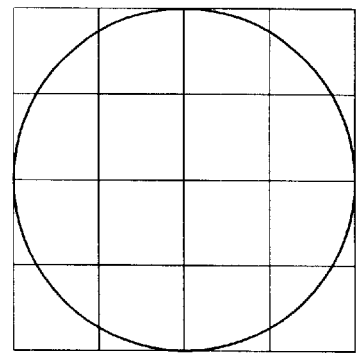
FIG. 13B is an enlarged view of a single bar element of a bar code printed by a 150 dpi resolution printer.

An illustrative example of additional practical effects introduced above will now be provided. For the sake of clarity and illustrative purposes, the dots shown in FIGS. 13A and 13B are not shown in any overlapping arrangement as is employed by some digital printers. Referring to FIG. 13A, in view of FIGS. 3–10, an enlarged view of a single bar element of the bar code 37 printed in accordance with the present invention described above is shown. Although a 4×4 array of 600 dpi size dots totaling sixteen (16) print data bits forms the bar element, it has been produced by only one (1) data bit. In contrast, referring to FIG. 13B, in view of FIGS. 3–10 and 13A, an enlarged view of a same size single bar element as that shown in FIG. 13A printed by a one hundred fifty (150) dpi printer is shown. This bar element may also be printed with only one (1) data bit. However, its print quality is poor. Therefore, those skilled in the art will recognize that the present invention produces the benefit of being able to take advantage of the higher resolution printer to produce a higher quality image while employing reduced print data generation requirements of a lower resolution printer. This is particularly advantageous for the postage metering industry where the accounting module 340 is a secure cryptographic microprocessor based system that must process numerous calculations and write operations for each transaction. Reducing the data generation requirements of the accounting module 340 assists in lowering transaction times.

Those skilled in the art will also recognize that various modifications can be made to preferred embodiment described above without departing from the spirit of the present invention. For example, the region number IDa, the start column number IDb and the start row number IDc of the instruction data ID may be eliminated if the exchange of data between the accounting module 340 and the print head controller 320 is more closely controlled. The print data bit blocks may be transmitted in a previously defined sequence from the accounting module 340 to the print head controller 320 while the print head controller 320 expands out the print data bits in a corresponding previously defined manner to generate the entire bit map of the postal indicium 30. As another example, the instruction data ID may include expansion data and bit data IDc and no region data. Thus, the region parameter data RPD would not need to be stored at the print head controller 320. Thus, the print head controller 320 would expand the bit data IDc within the data block according to the expansion data contained with the instruction data ID. As yet another example, the partition of the postal indicium 30 into regions may take on any desired configuration. The entire postal indicium 30 may be one (1) single region. Alternatively, the postal indicium 30 may be divided into hundreds of regions. The exact division of the desired image or postage indicium 30 is subject to wide discretion. Good candidates for extra regions are the leading and trailing portions of the bar code 37 which do not represent 2D bar code elements. As yet still another example, there may not be any instruction data ID transmitted for the no print spaces (regions R2 and R7) or the fixed graphic elements (Eagle 31 and FIM 34) of the indicium 30. Instead, this portion of the print bit map data for the postal indicium 30 may be stored in the NVM 324 of the print head controller 320 and inserted as necessary into the expanded print data PD to produce the final bit map. As yet still another example, the table T1 and the region parameter data RPD may not be stored in memory at all. Instead, the region parameter data RPD may be implemented in hardware (discrete logic components) within the print head controller 320. As yet still another example, the print head controller 320 may be located in the printer module 100 or its functionality could be divided between the micro control system 300 and the printer module 100.

Although the above description has been provided with respect to printing a postal indicium 30 in a postage metering application, the inventive aspects of the present invention may be employed in any printing application where print jobs are highly standardized. As examples, point of sale (POS) receipts, tickets (air line, event, lottery, etc.), coupons, account statements (checking, mutual fund, utility, etc.) and checks are all applications where the desired image is standardized. Therefore, the term transaction data TD above should be construed broadly to encompass that variable data which differentiates one desired image from subsequent desired images.

Based on all of the above, the inventive concept in its broader aspects is not limited to the specific details of the preferred embodiments but is defined by the appended claims and their equivalents.

What is claimed is:

1. A print signal generation system for generating print bit map data corresponding to a desired image where the print bit map data is utilized by a digital printing device to print the desired image, the system comprising:
    region parameter data including region data defining a partitioning of the desired image into a plurality of regions and expansion data;
    a first data generation system for generating transaction data associated with the desired image and using the transaction data in combination with the region parameter data to generate print instruction data; and
    a second data generation system in operative communication with the first data generation system for receiving the print instruction data from the first data generation system and expanding the print instruction data based upon the region parameter data to generate the print bit map data.

2. The system of claim 1, wherein:
    the expansion data includes X-direction expansion data and Y-direction expansion data.

3. The system of claim 2, wherein:
    the X-direction expansion data includes an X-direction expansion factor that is distinct for each of the plurality of regions of the desired image; and
    the Y-direction expansion data includes a Y-direction expansion factor that is distinct for each of the plurality of regions of the desired image.

4. The system of claim 2, wherein:
    the region parameter data is embedded within the print instruction data and the print instruction data also includes a bit map string.

5. A method of generating print bit map data corresponding to a desired image, the method comprising the step(s) of:
    defining parameter data including region data partitioning the desired image into a plurality of regions and expansion data;
    generating transaction data associated with the desired image at a first data generation system;
    generating print instruction data at the first data generation system using the transaction data in combination with the region parameter data;
    transmitting the print instruction data from the first data generation system to a second data generation system; and
    expanding the print instruction data based upon the region parameter data to generate the print bit map data.

6. The method of claim 5, wherein:
    the expansion data includes X-direction expansion data and Y-direction expansion data.

7. The method of claim 6, wherein:
    the X-direction expansion data includes an X-direction expansion factor that is distinct for each of the plurality of regions of the desired image; and
    the Y-direction expansion data includes a Y-direction expansion factor that is distinct for each of the plurality of regions of the desired image.

8. The method of claim 7, further comprising the step(s) of:
    embedding the region parameter data within the print instruction data; and
    wherein the print instruction data includes a bit map string.

9. A postage metering system comprising:
    a print signal generation system for generating print bit map data corresponding to a postal indicium, the print signal generation system including:
    region parameter data including region data defining a partitioning of the postal indicium into a plurality of regions and expansion data;
    a first data generation system for generating transaction data associated with the postal indicium and using the transaction data in combination with the region parameter data to generate print instruction data; and
    a second data generation system in operative communication with the first data generation system for receiving the print instruction data from the first data generation system and expanding the print instruction data based upon the region parameter data to generate the print bit map data; and
    a digital printing device in operative communication with the second data generation system for receiving the print bit map data and using the print bit map data to print the postal indicium.

10. The system of claim 9, wherein:
    the expansion data includes X-direction expansion data and Y-direction expansion data.

11. The system of claim 10, wherein:
    the X-direction expansion data includes an X-direction expansion factor that is distinct for each of the plurality of regions of the postal indicium; and
    the Y-direction expansion data includes a Y-direction expansion factor that is distinct for each of the plurality of regions of the postal indicium.

12. The system of claim 10, wherein:

the region parameter data is embedded within the print instruction data and the print instruction data also includes a bit map string.

13. The system of claim 10, wherein:

the plurality of regions includes a bar code region and a non-bar code region; and the expansion data for the a bar code region is different from the expansion data for the non-bar code region.

14. The system of claim 13, wherein:

the first data generation system is incorporated into a postage metering module that accounts for postal funds; and the second data generation system is located outside the postage metering module and incorporated into a printer control module that is operatively connected to the digital printing device.

15. The system of claim 14, wherein:

the postage metering module is a centrally located server; and the printer control module is incorporated into a personal computer.

16. A method of generating print bit map data corresponding to a postal indicium, the method comprising the step(s) of:

defining parameter data including region data partitioning the postal indicium into a plurality of regions and expansion data;

generating transaction data associated with the postal indicium at a first data generation system;

generating print instruction data at the first data generation system using the transaction data in combination with the region parameter data;

transmitting the print instruction data from the first data generation system to a second data generation system; and expanding the print instruction data based upon the region parameter data to generate the print bit map data.

17. The method of claim 16, wherein:

the expansion data includes X-direction expansion data and Y-direction expansion data.

18. The method of claim 17, wherein:

the X-direction expansion data includes an X-direction expansion factor that is distinct for each of the plurality of regions of the postal indicium; and the Y-direction expansion data includes a Y-direction expansion factor that is distinct for each of the plurality of regions of the postal indicium.

19. The method of claim 17, further comprising the step(s) of:

embedding the region parameter data within the print instruction data; and wherein the print instruction data includes a bit map string.

20. The method of claim 17, wherein:

the plurality of regions includes a bar code region and a non-bar code region; and the expansion data for the a bar code region is different from the expansion data for the non-bar code region.

21. The method of claim 20, wherein:

the first data generation system is incorporated into a postage metering module that accounts for postal funds; and the second data generation system is located outside the postage metering module and incorporated into a printer control module that is operatively connected to the digital printing device.

22. The method of claim 21, wherein:

the postage metering module is a centrally located server; and the printer control module is incorporated into a personal computer.

* * * * *